(12) United States Patent
Nakano

(10) Patent No.: US 6,195,118 B1
(45) Date of Patent: *Feb. 27, 2001

(54) TIME-DIVISION STILL PICTURE TELEVISION SYSTEM

(76) Inventor: Keizo Nakano, 769-26, Nase-machi, Totsuka-ku, Yokohama-shi, Kanagawa-ken, 245 (JP)

(*) Notice: Subject to any disclaimer, the term of this patent is extended or adjusted under 35 U.S.C. 154(b) by 0 days.

This patent is subject to a terminal disclaimer.

(21) Appl. No.: 08/945,469
(22) PCT Filed: May 27, 1996
(86) PCT No.: PCT/JP96/01417
§ 371 Date: Nov. 20, 1997
§ 102(e) Date: Nov. 20, 1997
(87) PCT Pub. No.: WO96/38000
PCT Pub. Date: Nov. 28, 1996

(30) Foreign Application Priority Data

May 25, 1995 (JP) .................................................. 7-126067

(51) Int. Cl.⁷ ........................................................ H04N 7/00
(52) U.S. Cl. ............................. 348/24; 348/559; 348/569
(58) Field of Search .................................. 348/7, 10, 13, 348/24, 153, 159, 458, 459, 468, 476, 484, 485, 553, 555, 559, 564, 569, 722, 727, 728, 738; 370/458; 386/68; 710/1; H04N 7/00

(56) References Cited

U.S. PATENT DOCUMENTS

| | | | |
|---|---|---|---|
| 3,898,376 | * 8/1975 | Nabeyama et al. | 348/24 |
| 3,914,535 | * 10/1975 | Takezawa et al. | 348/24 |
| 4,739,402 | * 4/1988 | Maeda et al. | 348/468 |
| 4,757,371 | * 7/1988 | Nozawa et al. | 348/7 |
| 4,802,019 | * 1/1989 | Harada et al. | 386/68 |
| 5,150,200 | * 9/1992 | Hong | 348/559 |
| 5,157,511 | * 10/1992 | Kawai et al. | 386/68 |
| 5,239,543 | * 8/1993 | Janssens | 370/458 |
| 5,404,171 | * 4/1995 | Golstein et al. | 348/459 |
| 5,703,662 | * 12/1997 | Yoon | 348/728 |
| 5,715,018 | * 2/1998 | Fasciano et al. | 348/722 |
| 5,819,103 | * 10/1998 | Endoh et al. | 710/1 |
| 6,005,606 | * 12/1999 | Nakano | 348/24 |

FOREIGN PATENT DOCUMENTS

| | | | |
|---|---|---|---|
| 49-64318 | 6/1974 | (JP) | H04N/7/08 |
| 53-13861 | 12/1978 | (JP) | H04N/7/08 |
| 60-146593 | 8/1985 | (JP) | H04N/7/08 |

* cited by examiner

*Primary Examiner*—Sherrie Hsia
(74) *Attorney, Agent, or Firm*—Ladas & Parry

(57) ABSTRACT

The present invention provides a time-division still picture television system, by which a frame needed by a receiver can be selected by a simplified arrangement. A natural still picture frame including a reference frame is repeatedly transmitted in a certain sequence using the reference frame as reference. In a receiver's device, the reference frame is detected by a reference frame identification signal inserted in the scanning line in the vertical retrace interval, in display picture or sound, and the frame to be displayed is detected and displayed by counting the number of the received frames.

8 Claims, 7 Drawing Sheets

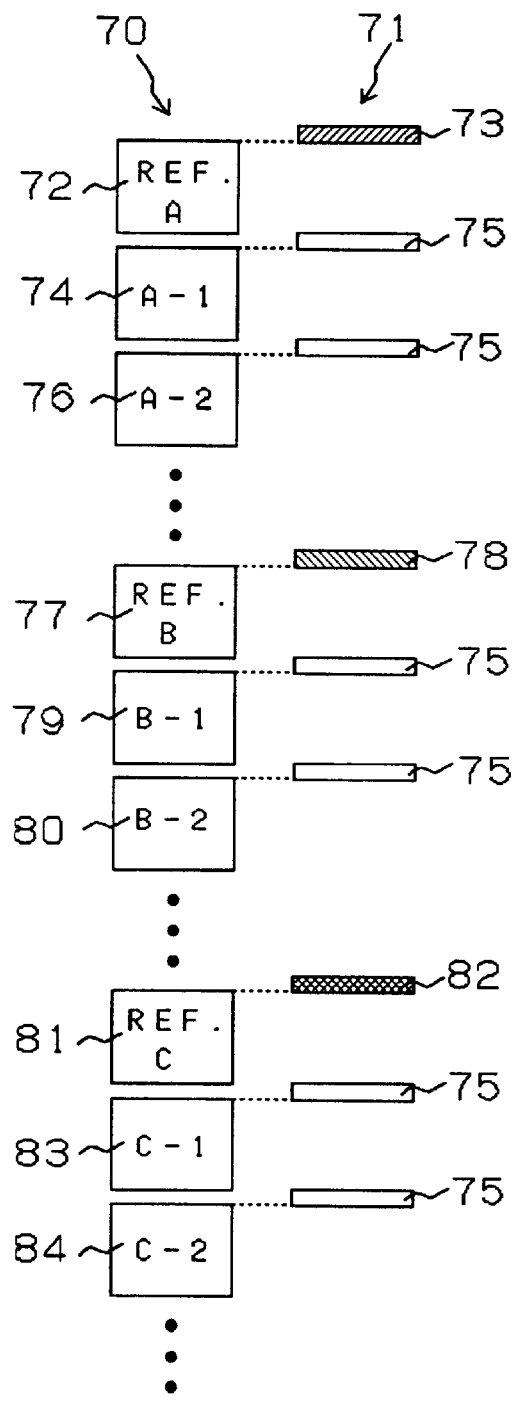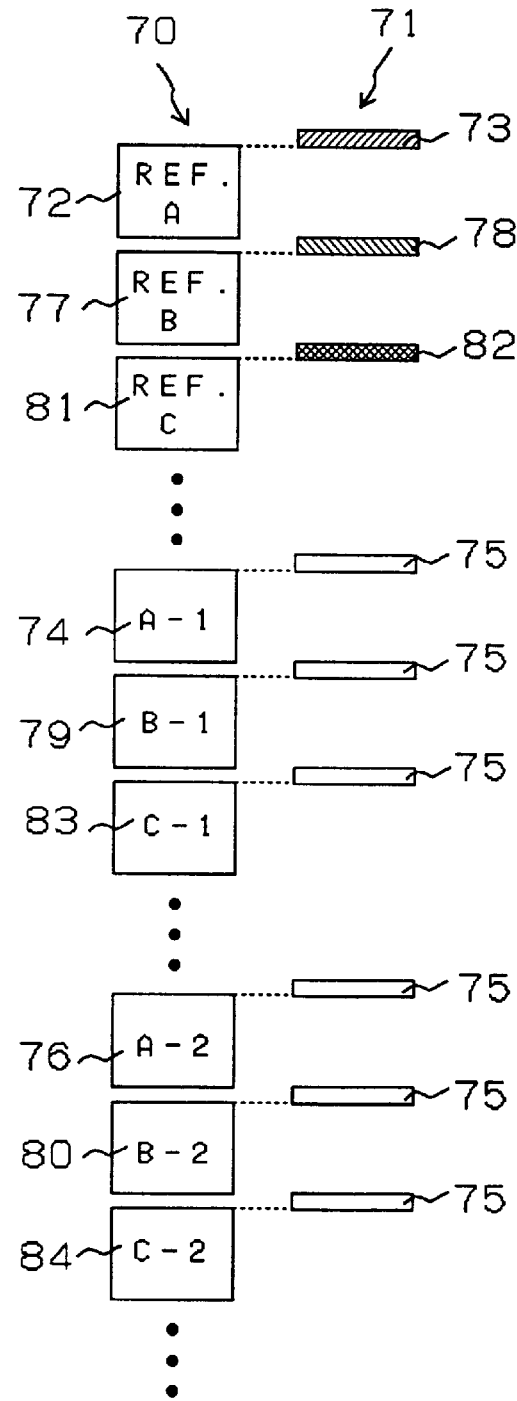

TIME-DIVISION STILL PICTURE TELEVISION SYSTEM

FIELD OF THE INVENTION

The present invention relates to an information service, which is provided using television broadcasting such as terrestrial wave broadcasting, CATV, satellite broadcasting, etc., and in particular to a system for providing information service by still picture television broadcasting.

BACKGROUND ART

In the so-called information-oriented age as we are today, various types of electric and electronic information such as sound, picture, text data, binary data, etc. are now handled using diverse types of transmitting means. Of these different types of electric and electronic information, low quality voice, low speed monochrome still picture, low speed text data and low speed binary data are transmitted via public telephone line as an electric signal, high speed monochrome still picture, high speed text data and high speed binary data are transmitted by ISDN (Integrated Service Digital Network) line as an electric signal, and high quality voice and moving picture are transmitted via terrestrial wave broadcasting, satellite broadcasting or CATV as modulated wave or via optical fiber transmission route as modulated light.

In the information-oriented age as described above, attention is now focused on interactive information systems as a promising major information system, in which general public who, hitherto, have been merely receivers of the one-way information sent to them can selectively receive and positively utilize the information.

Interactive information systems currently used are answering systems using an automatic voice response system via a public telephone line, videotex systems represented by CAPTAIN (Character and. Pattern Telephone Access Information Network) using a still picture, and VRS (Video Response System) using the moving picture via dedicated line.

Among these interactive information systems, the answering system relies only on audio information. Thus, it is not possible to obtain sufficient information, and the inputted or outputted data cannot be visually confirmed.

In the videotex system, characters and pictures are displayed by using character codes. This means that there is a limitation in the contents of display, and the picture information using character codes can provide smaller amount of information than a natural picture.

The VRS system can handle natural moving picture and has no limitation in the contents of display, while communication cost is high because it utilizes a wide band dedicated transmission path.

On the other hand, in the currently available television system, information services such as television shopping, various types of subscription, weather forecast, traffic information, etc. are offered although these are not interactive. Many of these types of picture information needed in these information services are still picture information, and moving picture information is needed less frequently. In this respect, in the currently used television system offering these information services, the still picture is broadcast as moving picture. That is, by sending several hundreds to several thousands of the same picture, a still picture is displayed on the screen of a television set.

Therefore, the transmission of still picture is very costly, and it is not available to provide an interactive information service to transmit still pictures to meet the requirements of users.

For example, in case of television shopping, which is a typical information service using picture, it has been practiced to date that the user utilizes products information on the still pictures, which are sent one-way from a broadcasting station, and there have been provided no interactive information service, in which the picture of desired products is displayed on the television set according to the intention of the users and the users carry out shopping based on the displayed contents.

A television picture consists of frames. In NTSC system as adopted in Japan, the picture is sent at a rate of 30 frames per second. If one still picture is transmitted for each frame, 30 natural still pictures are transmitted per second.

As the still picture broadcasting system based on this principle, there is a system called "time-division still picture broadcast system".

FIG. 1 is a schematical drawing to explain the time-division still picture broadcast system.

In the time-division still picture broadcast system, still pictures 3-1, 3-2, 3-3, 3-4, . . . are at first photographed by independent television cameras 4-1, 4-2, 4-3, 4-4, . . . at a still picture broadcasting station 1. Then, these still pictures are composed to television signals, which comprise frames 5-1, 5-2, 5-3, 5-4, . . . and these are transmitted to still picture receiving devices 2-1, 2-2, 2-3, 2-4, . . . .

Upon receipt of the television signals, the necessary frames are stored to frame memories at the still picture receiving device 6-1, 6-2, 6-3, 6-4, . . . . Then, the stored frames are repeatedly read out from the frame memories, and are displayed as still pictures on display units 7-1, 7-2, 7-3, 7-4, . . . .

Selection of necessary frames and recording of the frames to the frame memories are performed by means such as inserting a frame identification signal to the horizontal scanning line during the vertical retrace interval of each frame.

In the interactive still picture information service system, selection of the necessary frames and recording them to the frame memories are carried out by inserting the frame identification signal to the horizontal scanning line during the vertical retrace interval of each frame at the still picture broadcasting station and by detecting the frame identification signal at the still picture receiving device.

FIG. 2 represents a method to receive still pictures using the frame identification signal. In this figure, among the elements to constitute a frame, a picture displayed on a screen is represented by reference numeral 10, and a picture identification signal inserted to the horizontal scanning line during the vertical retrace interval not displayed on the screen is represented by reference numeral 11. These are arranged in vertical direction along time base.

The picture 10 includes a menu picture 12 and information pictures 14, 16, . . . .

The frame identification signal 11 includes a menu screen identification signal 13 and information screen identification signals 15, 17, . . . . These identification signals are designed as different signals, and the desired frame can be selected according to the identification signal. In this case, the menu screen to display information of the entire still picture broadcast is used, but this menu screen is not necessarily required.

Among the frame identification signals used in the time-division still picture broadcast system, the signal inserted in the horizontal scanning line during the vertical retrace interval between frames is most generally used. In the method to use these frame identification signals, the identification signal is used for each frame. This means that it requires troublesome procedure to insert the identification signals and consumption of the radiowave resources increases because the inserted frame identification signals occupy the television signal. The present inventor has proposed a method in Japanese Patent Application 6-289357, in which a specific picture frame is set as a reference frame, and ordinary picture frames other than the reference frame can be selected by counting the number of frames based on positional relationship with the reference frame. Also, the present inventor has proposed a method to use audio band of television signal as the frame identification signal, and a method to use a frame identification signal transmitted by means other than television signal, e.g. a telephone line.

The present invention is an invention relating to the Japanese Patent Application 6-289357.

DISCLOSURE OF THE INVENTION

The still picture transmitted in the time-division still picture broadcast system is repeatedly transmitted in a predetermined sequence. Therefore, if it is known that a specific frame is used as a reference and in what kind of relationship with the specific frame the desired frame is transmitted, the desired frame can be identified using the specific reference frame as a clue.

Based on the above view, it is an object of the present invention to provide a method and an apparatus, by which it is possible to easily capture the desired still picture frame in a time-division still picture broadcast system.

In the method for capturing a still picture according to the present invention, a frame added with an identification signal by adequate means is used as a reference frame, while no identification signal is added to the frames to be captured, and they are defined by the number of frames counted from the reference frame. The reference frame and the still picture frames counted from the reference frame are repeatedly transmitted as one series.

In the apparatus for capturing still picture according to the present invention, counting of frames is started by finding the reference frame using the identification signal, and the frame, at which the predetermined number of frames is counted, is captured as the still picture.

With the arrangement as described above, it is possible not only to simplify the arrangement of the still picture capturing apparatus but also to transmit audio signal and picture signal other than the identification signal in frames other than the reference frame and to transmit information utilizing the horizontal scanning line during the vertical retrace interval.

To insert the reference frame identification signal, there are three methods: to insert in the horizontal scanning line, to insert in the picture signal, and to insert in the audio signal.

The information on the number of frames from the reference frame for the desired frame picture is given in advance in some cases, or it is given by the reference frame or by the information frame such as menu screen in some other cases.

The number of frames is counted at a first field or further at a second field.

The present method can also be applied not only for a still picture television system using frames as a series but also for a time-division still picture television system using fields as a series. In this case, the desired still picture is captured by counting the number of fields instead of counting the number of frames.

BRIEF DESCRIPTION OF THE DRAWINGS

FIGS. 6(a) and (b) represent drawings to explain an embodiment of the present invention using a plurality of reference frames;

THE BEST MODE FOR CARRYING OUT THE INVENTION

In the following, description will be given on embodiments of the present invention referring to the accompanied drawings.

Figure 1:
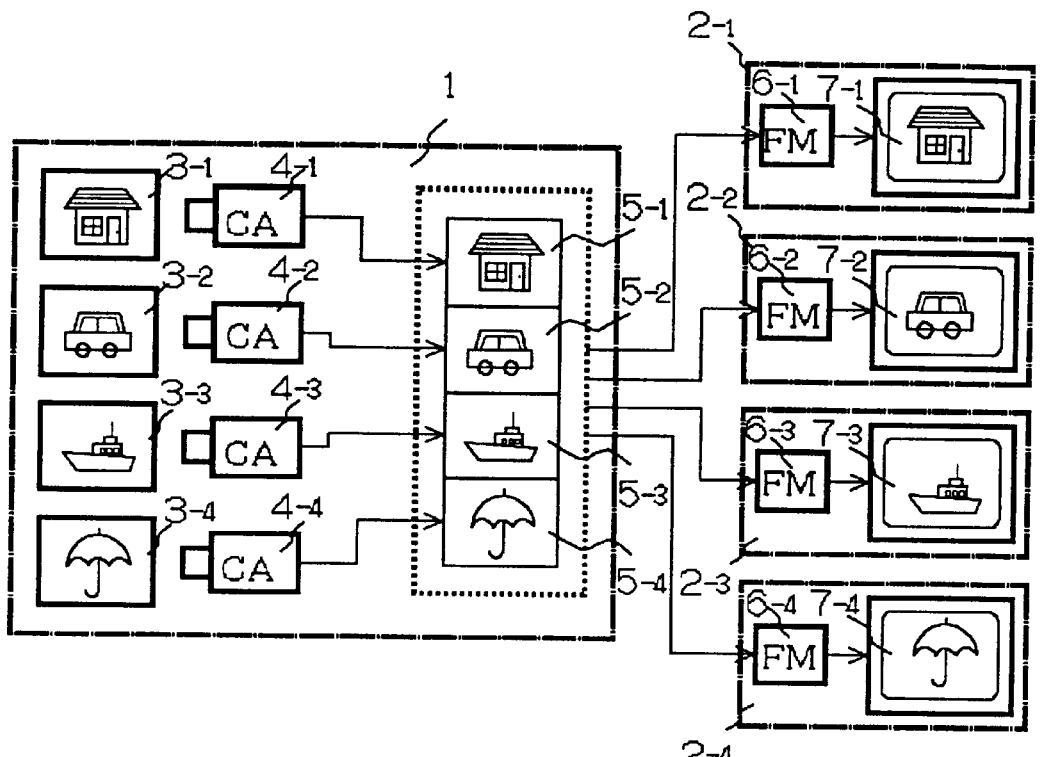
FIG. 1 represents an arrangement of a time-division still picture television system.
Figure 2:
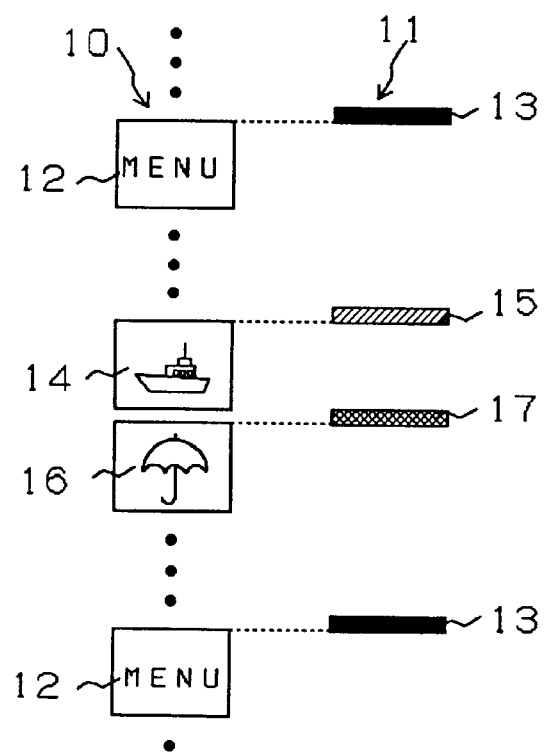
FIG. 2 is a drawing to explain the time-division still picture television system.
Figure 3:
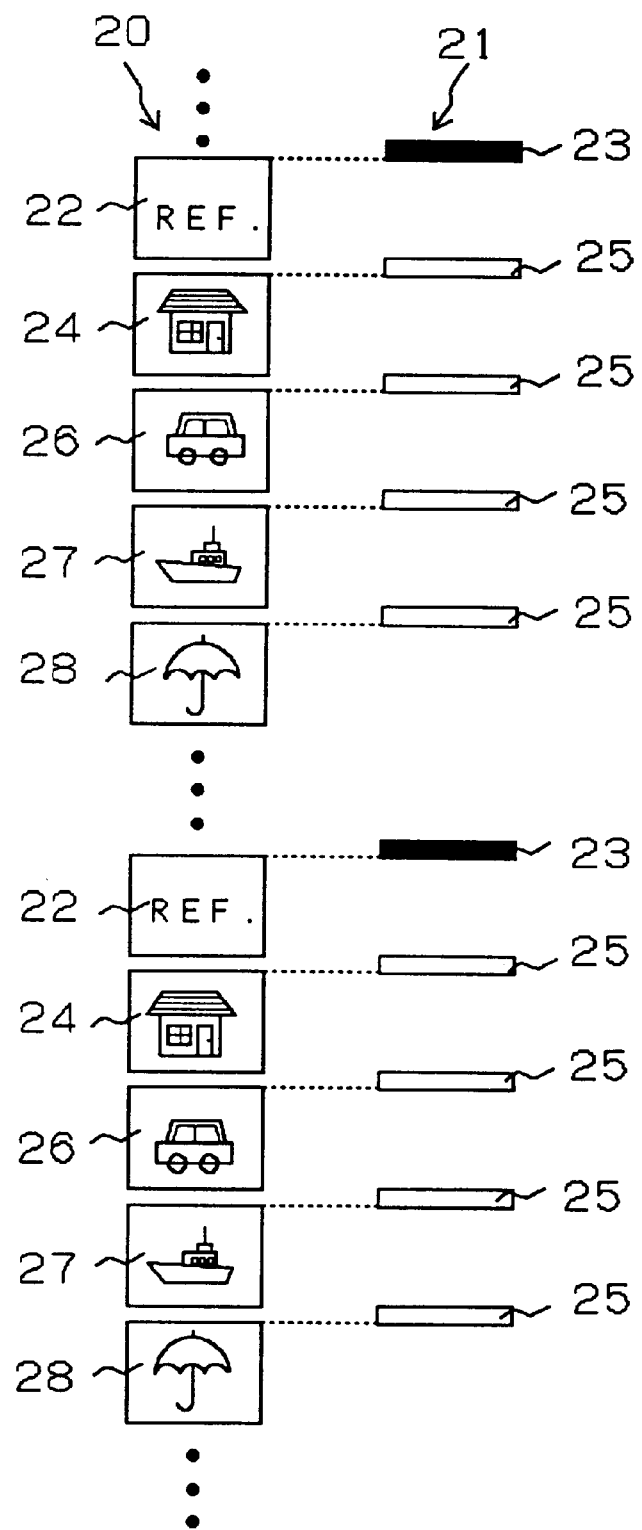
FIG. 3 represents a basic embodiment of the present invention.

FIG. 3 shows a first embodiment of the present invention, in which a reference frame identification signal is inserted in the horizontal scanning line as a basic arrangement of the method of the present invention, and still picture frames are transmitted repeatedly in a predetermined sequence. In this figure, reference numeral 20 represents a picture displayed on a screen among the elements to constitute a television frame. Among the elements to constitute the television frame, a portion of the vertical retrace interval signal not displayed on the screen is represented by reference numeral 21. These are arranged in vertical direction along time base.

In the picture 20, reference numeral 22 represents a reference frame picture, and reference numerals 24, 26, 27 and 28 each represents a frame picture other than the reference frame. In the vertical retrace interval signal portion 21, reference numeral 23 represents a vertical retrace interval signal including the reference frame identification signal, and reference numeral 25 represents a vertical retrace interval signal not including the reference frame identification signal.

As an example, it is supposed that a still picture frame which a user wants to receive has been transmitted at 50th in the order as counted from the reference frame.

When the number of frames, i.e. 50, which the user wishing to receive should count, is inputted to the still picture receiving device, the still picture receiving device first watches the the vertical retrace interval signal of each frame. When the reference frame identification signal has been found, frame counting is started according to the subsequent vertical retrace interval. When the predetermined count (50 in this case) is counted, the frame is captured as still picture, and the captured still picture is displayed.

Now, description will be given on a method to count the frames.

In the NTSC television system with interlace scanning, a frame to constitute a picture comprises two fields, i.e. a first field and a second field. Because a television signal for one frame comprises 525 horizontal scanning lines, one frame comprises the first field and the second field, each comprising 262.5 horizontal scanning lines. Therefore, starting position of the scanning lines is different between the first field and the second field. The scanning line in the first field starts from an end of the screen, while the scanning line in the second field starts from the center of the screen. In other words, the timing to start in the first field of a vertical synchronizing signal separated from the horizontal synchronizing signal agrees with the rise-up timing of the horizontal synchronizing pulse, while the timing to start in the second field is delayed by half-cycle (H/2) of the horizontal synchronizing pulse from the rise-up timing of the horizontal synchronizing pulse.

Frame counting is performed according to the above principle. It is judged that the field where the start timing of the vertical synchronizing signal agrees with the rise-up timing of the horizontal synchronizing pulse is the first field, and that the field where the start timing of the vertical synchronizing signal is delayed by half-cycle (H/2) of horizontal synchronizing pulse from the rise-up timing of horizontal synchronizing pulse is the second field, and either one of them is counted.

In this case, the number of frames is generally counted by the first field, while the number of frames may be counted by the second field when necessary.

Now, description will be given on the reference frame identification signal.

The television signal comprises video signal and audio signal, and the video signal further comprises picture signal and synchronizing signal. In the picture signal, there are information displayed on a screen and information inserted in the vertical retrace interval and not displayed on the screen. Therefore, roughly speaking, the reference frame identification signal can be inserted in the audio signal, display screen and the vertical retrace interval.

FIG. 4 shows forms of signals to broadcast teletext program and closed-caption television program as have been practiced so far, to explain the case where the reference frame identification signal is inserted in the vertical retrace interval. In this figure, polarity of the signal is reversed.

Figure 4A:
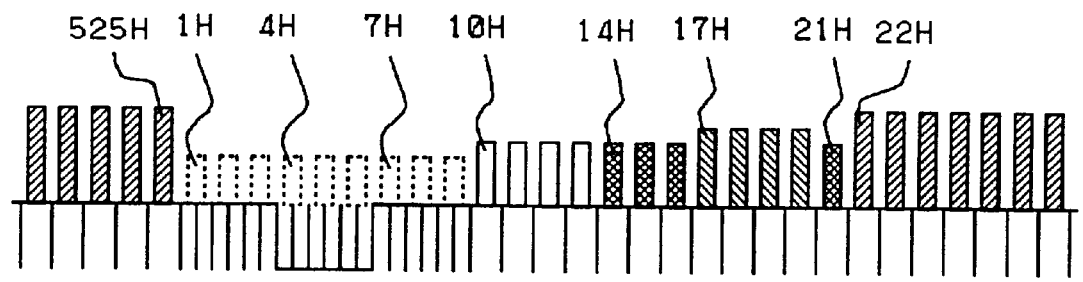
FIGS. 4(a)–(c) are drawings to explain an embodiment of the present invention utilizing the vertical retrace interval.
Figure 4B:
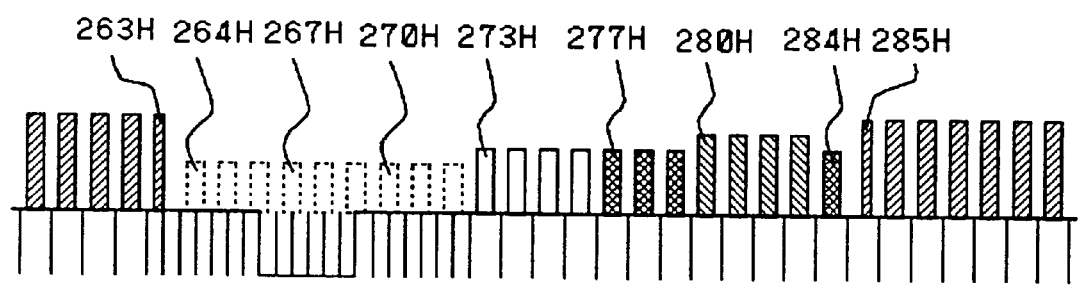

FIG. 4(a) shows signals of the first field of the television signal, and FIG. 4(b) shows signals of the second field. In these figures, horizontal synchronizing pulses and equalizing pulses are shown underneath, while signals inserted in the horizontal scanning line are shown above.

The signals of the first field in FIG. 4(a) and those of 1–3H and 7–9H and the latter half of 263H–265H and 270H— the latter half of 272H in the second field shown in FIG. 4(b) are the equalizing pulses. The signals of 4–6H and the latter half of 266H— the first half of 269H are the vertical synchronizing pulses, and no signal is inserted into the horizontal scanning line of these portions.

Television picture signals are inserted to 22–262H and 263H and the latter half of 285H, 286–524H and the first half of 525H.

Therefore, 10–21H and 273–284H can be used for the insertion of various types of signals. However, 17–20H and 280–283H are used for operation of the broadcasting station, and hence, 10–16H, 21H and 273–279H and 284H are actually available. In the teletext broadcasting, scanning lines 14–16H, 21H, 277–279H and 284H are used in view of compatibility of the existing receiving device.

Closed caption signal may be inserted in 21H and 284H.

Figure 4C:
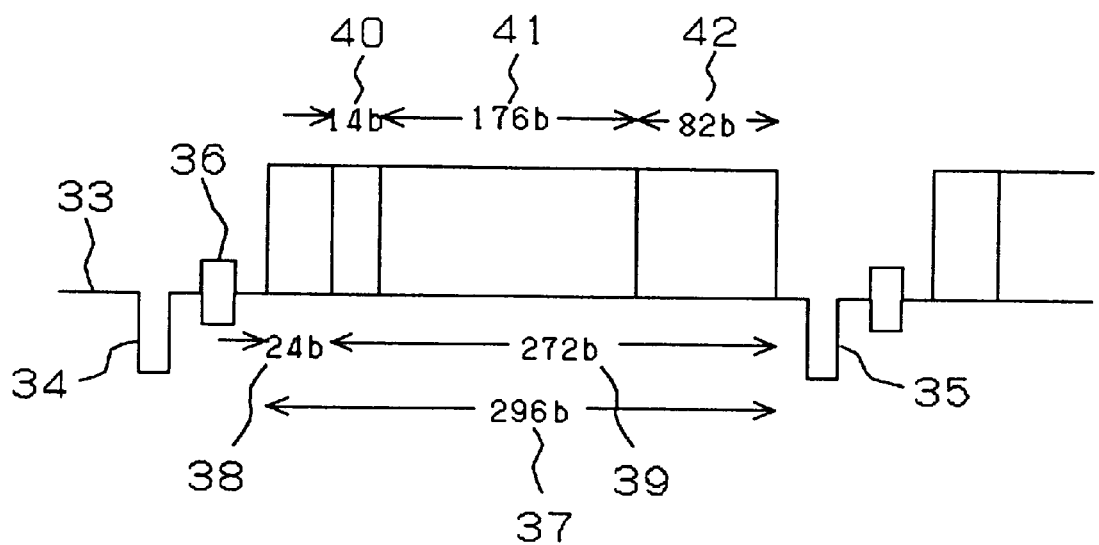

FIG. 4(c) shows a form of data format in case text signals are multiplexed in the horizontal scanning line in the teletext broadcasting. Reference numeral 33 represents a video signal, and the portion between the horizontal synchronizing pulses 34 and 35 is the horizontal scanning line where the signals are inserted. Immediately before the signals, a color burst signal 36 is inserted. After the color burst signal 36, a data line 37 is inserted. In the data line 37, 296-bit data can be inserted, and it comprises a synchronization portion 38 having 24-bit data capacity and a data packet 39 having 272-bit data capacity. Further, the data packet 39 comprises a prefix 40 having 14-bit data capacity, a data block 41 having 176-bit data capacity, and a check signal 42 having 82-bit data capacity, and the teletext broadcasting data is inserted into the data block 41.

The reference frame identification signal used in the present invention can be inserted into the data block 41 of the currently practiced teletext broadcasting. Because this data block has a capacity as large as 176-bit, large amount of information can be included in the reference frame identification signal, and this can be used for hierarchization of the reference frame identification signals as described later.

The data block in the teletext broadcasting has large data capacity, and large amount of reference frame identification signals can be inserted, while the teletext signals, i.e. digital data, are difficult to record in a video tape recorder for home use. Further, it is very difficult to exactly reproduce the recorded data because of jitter or phase delay caused by elongation or shrinking of the video tape or uneven rotation of the head. For this reason, it is not available to arrange a broadcasting system, which can produce a still picture broadcasting program including reference frame identification signal inserted in the data block of teletext broadcasting and broadcast it and record it in the video tape recorder for home use.

On the other hand, since the closed-caption television has less amount of data which can be recorded in the video tape recorder for home use, it is possible to arrange a broadcasting system, which can produce still picture broadcasting program including reference frame identification signals inserted to the closed caption signal portion, and also to record the program in the video tape recorder for home use.

Instead of the signal form in the closed-caption television, it is possible to use reference frame identification signal according an original signal form having less amount of information.

Description will be given now on counting of the number of frames from the reference frame.

As described above, frames are counted using the relationship between the start timing of the vertical synchronizing signal and rise-up timing of the horizontal synchronizing pulse as a clue, and the field where these agree with each other, i.e. the field where there is 4H, is judged as the first field. The field where these do not agree with each other, i.e. the field where there is 266H, is judged as the second field.

Thus, the number of frames is counted by counting only one of the fields. More concrete counting is performed using a presettable counter to output a signal when a predetermined number has been counted.

The number of frames to be counted as provided by various types of means is inputted in advance to the presettable counter as preset data. When the reference frame signal is detected, the presettable counter performs processing such as initialization of the number of counts, and the counting of the number of frames is started. The presettable counter is divided to an up-counter and a down-counter. In case of the presettable up-counter, the number of frames is counted as described above. When the number of frames inputted in advance has been reached, the counter outputs the signal, and the still picture is captured to the frame memory by this signal.

As the presettable counter, the presettable up-counter to successively add the counted value is generally used, while the presettable down-counter to successively subtract the counted value may be used. In case the presettable down-counter is used, on the contrary to the case of the presettable up-counter, the number of frames counted is subtracted from the number of frames inputted in advance. When the result of subtraction reaches 0, the presettable down-counter outputs the signal, and the still picture is captured to the frame memory by this signal.

When the number of frames is counted and the signal corresponding to the result is outputted to capture the still picture to the frame memory by this signal, if the number of frames is counted using 4H of the first field as a clue, the time interval is: $18/(525 \times 30) = 1/875$ second because the interval up to 22H where picture signal is inserted is 18H. In case operation of the circuit to control the frame memory is slow, the desired still picture may not be captured in the frame memory.

In such a case, the operation to capture the still picture is started when the first field or the second field of the still picture one frame before has been counted.

In order to capture the still picture frame as desired by the frame counting method, it is necessary to have information on the number of frames from the reference frame of the still picture. The most simplified procedure is that the information on the number of frames is given in advance by means such as printed matter, whereas it is possible to execute the frame counting method only by the still picture broadcasting, i.e. by broadcasting using a information frame such as a menu screen and the reference frame transmitted in the still picture broadcasting, without using other information medium such as printed matter.

Further, by providing the reference frame with the function of the menu screen and by giving sub-menu function to the still picture screen captured according to the menu, it is possible to hierarchize the still picture and to broadcast diverse types of still picture information.

FIG. 5 represents an embodiment with the above arrangement.

Figure 5A:
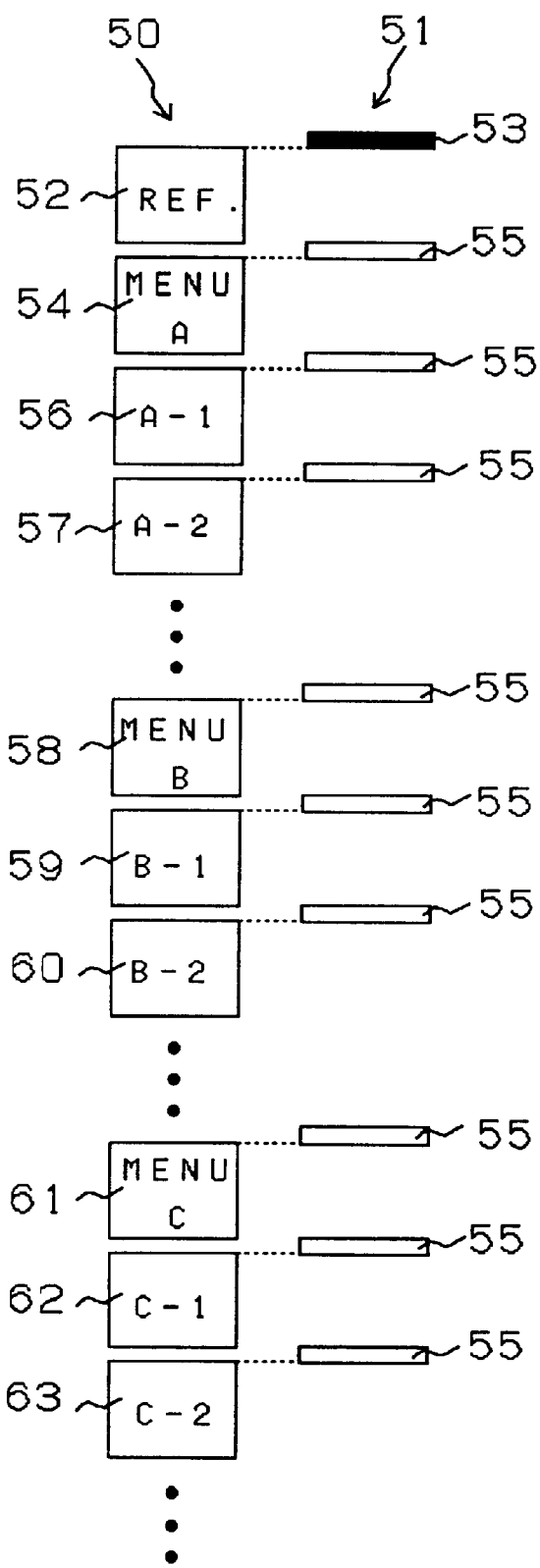
FIGS. 5(a)–(e) represent drawings to explain an embodiment of the present invention where still pictures have hierarchical structure.

A basic television signal arrangement in case the menu screen is used with the frame counting method is shown in FIG. 5(a), and display examples of the menu screens are shown in FIGS. 5(b)–(e).

In the television signal arrangement shown in FIG. 5(a), reference numeral 50 represents a picture displayed on a screen among the elements to constitute the frame, and 51 represents an identification signal inserted in the horizontal scanning line during the vertical retrace interval not displayed on the screen among the elements to constitute the frame, and these are arranged in vertical direction along the time base.

The picture 50 comprises a reference menu screen 52, a plurality of sub-menu screens 54, 58, 61, . . . and information screens 56, 57, . . . , 59, 60, . . . , 62, 63, . . . , which accompany each of the menu screens 54, 58, 61, . . . . Also, the signal 51 comprises a reference frame identification signal 53 and signals 55, 55, 55, . . . which do not contain identification signals.

Figure 5B:
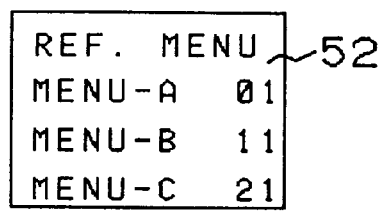

On the reference menu screen 52 shown in FIG. 5(b), the numbers of frame counts on each of the sub-menu screens 54, 58 and 61 are displayed.

Further, menus of the information screen included in a sub-menu A are displayed included in the screen 54 of the sub-menu A. Menues of information screen included in a sub-menu B are displayed on the screen 58 of the sub-menu B. On the screen 61 of the sub-menu C, menues of the information screen included in the sub-menu C are displayed.

To simplify the explanation in this embodiment, it is supposed that the sub-menu screens are three screens of A, B and C and that 9 information screens are included in each of these sub-menu screens. The above number is used to facilitate explanation, and it is needless to say that any other number may be used as the number of screens. Also, in FIGS. 5(c)–(e), only 4 menus of information screens are displayed, while 9 menus are actually displayed on the menu screen of this embodiment.

In the system of the embodiment as described above, the receiver's device at first recognizes the reference frame identification signal 53. Then, the reference frame screen 52 is captured in the frame memory of the receiver's device, and the reference menu screen 52 is displayed as shown in FIG. 5(b).

If the receiver sees the screen and wishes to have the display of the sub-menu A and inputs "01" for example, the receiver's device recognizes again the reference frame identification signal repeatedly transmitted. Then, counting of the number of frames is started from the recognized reference screen. When the inputted "1" is counted, the sub-menu A screen is captured in the frame memory and is displayed.

When the number of the desired information screen, for example "04", is inputted according to the sub-menu displayed on the sub-menu screen A, the receiver's device calculates as: "1+0×10+4=5" because 4th information screen of the sub-menu A is at 5th (1+0×10+4=5) as counted from the reference frame. The reference frame identification signal repeatedly transmitted is recognized again. The counting of the number of frames is started from the recognized reference screen, and when the number "5" is counted, the information screen is captured in the frame memory and is displayed.

In case of the other sub-menu screens, similar processing is also performed. For example, in case it is wanted to see 2nd information screen of the sub-menu C, the number "21" is at first inputted to select the sub-menu C from the reference menu screen, and the sub-menu C located at 21st from the reference frame is displayed. Next, when the number "02" is inputted by the sub-menu C, the receiver's device calculates as: "1+2×10+2=23", and the reference frame identification signal as repeatedly transmitted is recognized again. The counting of the number of frames is started from the recognized reference screen, and when the number "23" is counted, the information screen is captured in the frame memory and is displayed.

With the arrangement as described above, frame counting of menu form can be performed by a single reference frame.

In case the reference frame identification signal is inserted in the horizontal scanning line during the vertical retrace interval, it is possible to insert signal other than the reference frame identification signal, not only in case the teletext signal method is adopted as the form of identification signal, but also in case the closed caption system is adopted. Based on this, it is possible for the receiver to obtain the still picture, with which the receiver is interested, within short time either directly or indirectly by giving different reference frame data to a plurality of reference frames.

FIG. 6 shows an embodiment with the above arrangement.

FIG. 6(a) shows a basic television signal arrangement in case the frame counting method is executed using a plurality of reference frames. FIG. 6(b) represents a modified television signal arrangement.

In the television signal arrangement as shown in FIG. 6(a), reference numeral 70 represents a picture displayed on a screen among the elements to constitute the frame, and 71 represents a signal inserted in the horizontal scanning line during the vertical retrace interval not displayed on the screen among the elements to constitute the frame, and these are arranged in vertical direction along the time base.

The picture 70 comprises a plurality of reference frames 72, 77, 81, . . . and information screens 74, 76, . . . , 79, 80, . . . , 83, 84, . . . to accompany these reference frames. The signal 71 comprises reference frame identification signals 73, 78, 82, . . . each being a different signal, and signals 75, 75, 75, . . . containing no identification signal.

The information on the reference frames is given in advance to the receiver. When the receiver inputs the identification signal data of the desired reference frame to a receiver's device, a reference frame with identification signal of the corresponding reference frame, e.g. the reference frame of a reference A screen, for example, is captured in the frame memory of the receiver's device and is displayed.

Figure 5C:
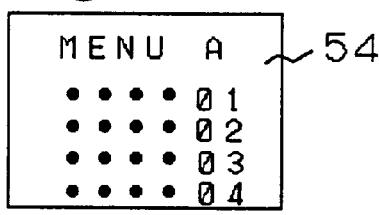
Figure 5D:
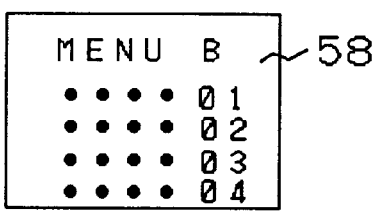
Figure 5E:
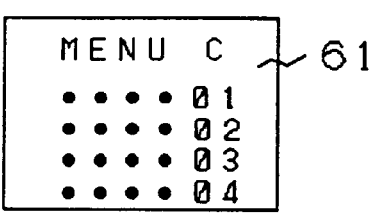

The reference A screen is a menu screen as shown in FIGS. 5(c), (d) or (e). When the receiver selects the desired information screen from the menu screen and inputs its number, for example the number "03", the receiver's device recognizes again the identification signal of the reference frame A repeatedly transmitted. The counting of the number of frames is started from the recognized reference screen, and when the inputted number "3" is counted, the information screen is captured in the frame memory and is displayed.

The reference frames and still picture frames which accompany the reference frames may be arranged as a continuous group as shown in FIG. 6(a), whereas the reference frames 72, 77, 81, . . . may be continuously arranged, and still picture frames 74, 79, 83, . . . and still picture frames 76, 80, 84, . . . may be continuously arranged respectively as shown in FIG. 6(b). In so doing, it is possible to reduce waiting time of the receiver.

In the above, description has been given on the case where the reference frame identification signal is inserted in the horizontal scanning line during the vertical retrace interval. In the following, description will be given on the case where it is inserted in other signals.

When the reference frame identification signal is inserted in the video signal, it can be inserted in the horizontal scanning line where generally the video signal displayed on a screen is inserted. In this case, the reference frame identification signal is displayed on the screen of the receiver's device. However, this screen is for one frame in length at the most, i.e. for 1/30 second, and it is the time for the several horizontal scanning lines when it is short, and this is practically negligible.

Figure 7A:
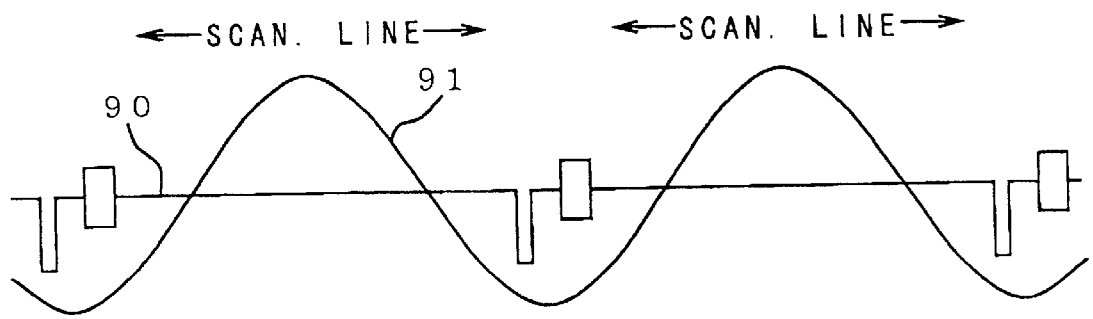
FIGS. 7(a) and (b) are drawings to explain an embodiment of the present invention using pictures.

FIG. 7(a) shows a first example. An AC signal 91 synchronized with a horizontal scanning line and having the same frequency is inserted in the horizontal scanning line 90 of the video signal. This AC signal 91 is an alternative current having frequency of: 525×30=15.75 KHz, and this can be easily detected by using a band filter, which allows only this frequency to pass. Because this signal continues for a certain period of time, this can be easily identified even when other similar signal may be present.

In this case, a vertical stripe with gradation is displayed on the screen.

Figure 7B:
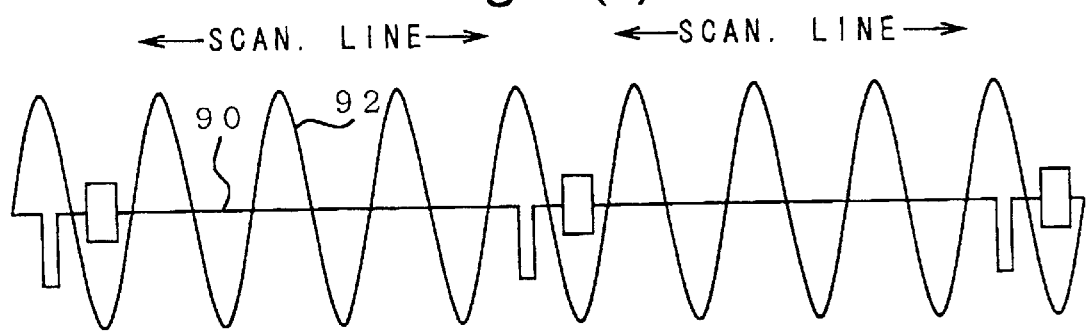

FIG. 7(b) represents a second example. An AC signal with ¼ cycle of the horizontal scanning line and synchronized with the horizontal scanning line is inserted in the video signal. This AC signal is an alternative current having frequency of: 525×30×4=63 KHz, and this can be easily detected by using a band filter, which allows only this frequency to pass. Because this signal is also continuous for a certain period of time, it can be easily identified even when other similar signal is present.

In this case, four vertical stripes with gradation are displayed on the screen.

Figure 8A:
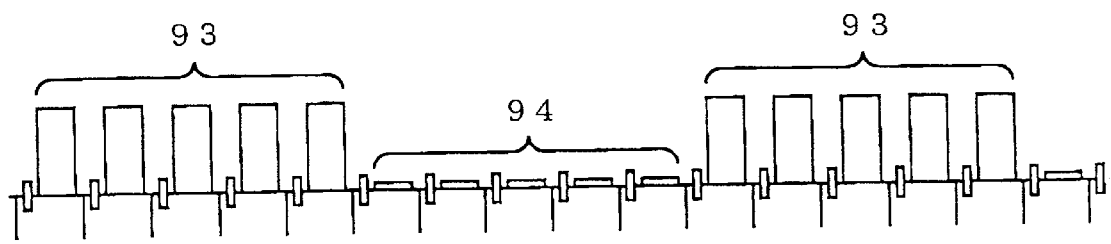
FIGS. 8(a) and (b) are drawings to explain another embodiment of the present invention using pictures.

FIG. 8(a) shows a third example. The reference frame identification signal of this example is different from the one shown in FIG. 7. The entire single horizontal scanning line contains a luminance signal of the same level. A plurality of signals with different luminance intensities are combined and repeated. In this example, a horizontal scanning line 93 with five signals of luminance level in white and a horizontal scanning line 94 with five signals of luminance level in black are repeated.

The signals are integrated by an integration circuit and are discharged by a discharge circuit, which has time constant of: 5/(525×30)=(1/3150) second. As a result, a triangular wave having frequency of 3150/2=1575 Hz is obtained. By this triangular wave, the reference frame is identified.

Figure 9A:
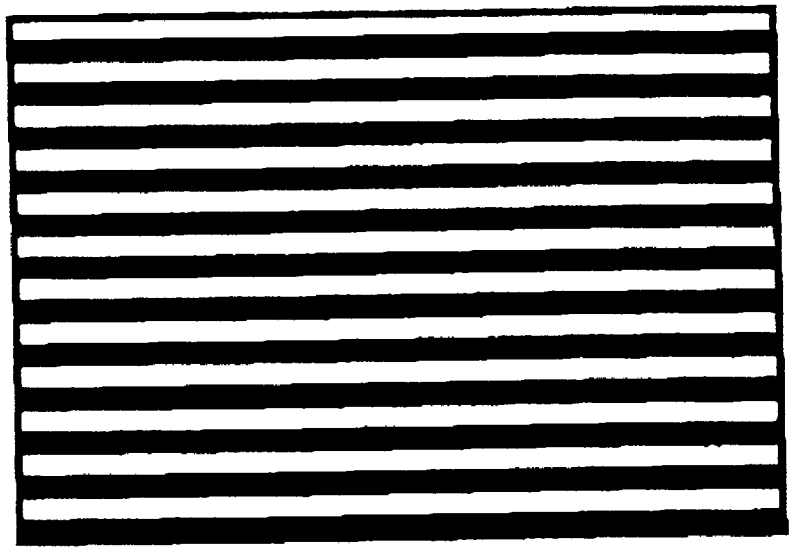
FIGS. 9(a) and (b) are drawings to show 24 horizontal stripes of white/black displayed on the screen.

In this case, about 24 horizontal stripes of white/black are displayed on the screen as shown in FIG. 9(a).

Figure 8B:
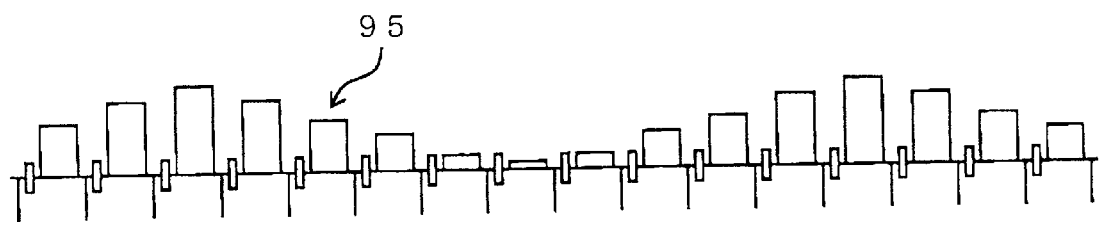

FIG. 8(b) shows a fourth example. The reference frame identification signal of this example is different from the one shown in FIG. 8(a). The entire single horizontal scanning line contains a luminance signal of the same level, but the luminance level for each of the horizontal scanning lines 95 changes in form of sine wave. In this example, the luminance level changes with 10 horizontal scanning lines as a unit.

This signal is picked up as a luminance signal, and a sine wave having frequency of 3150/2=1575 Hz is obtained from the luminance signal thus picked up, and the reference frame is identified from this sine wave.

Figure 9B:
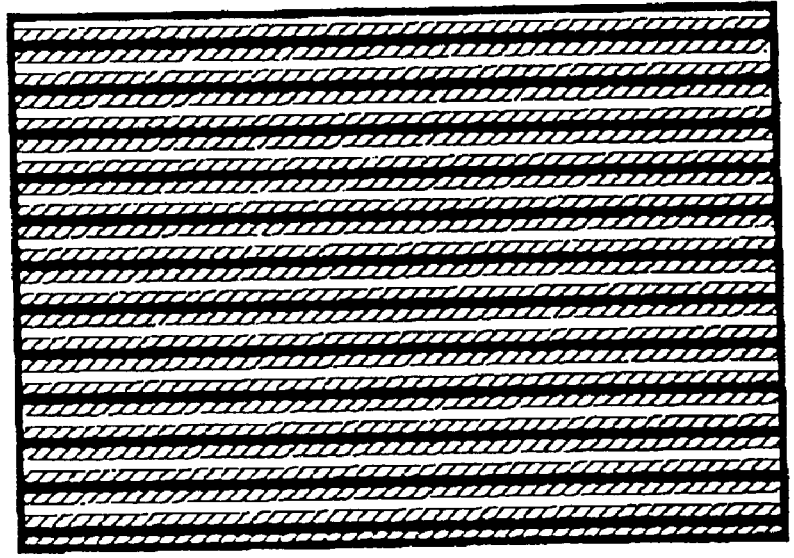

In this case, about 24 horizontal stripes of white/black are displayed on the screen as shown in FIG. 9(b).

Finally, description will be given on the case where the reference frame identification signal is inserted in the audio signal.

Because the television system also uses sound, it is also possible to insert the reference frame identification signal in the audio band.

As the reference frame identification signal to be inserted in the audio band, there are sound inserted in the main audio band, sound inserted in the sub-audio band, and signals other than sound inserted in the sub-audio band.

In case the reference frame identification signal is inserted in the main audio band, the reference frame identification signal is heard as sound to the receiver.

To avoid this, the reference frame identification signal should be inserted into the sub-audio band.

Also, as the signal to be inserted in the sub-audio band, adequate control signal of other than sound may be used.

In a television set, video signal and audio signal are separately processed, and even when it is tried to use the signal inserted in the audio band as a control signal to select a still picture, proper control may not be carried out.

In such a case, it would be better to transmit the signal inserted in the audio band earlier than the corresponding still picture frame.

In the above embodiments, description has been given on the case mainly where the still picture is supplied by broadcasting means, while the still picture in the time-division still picture television system according to the present invention can be provided by video package such as a video tape or a video disk. In particular, in case the same still picture is transmitted for a long time, it is effective to use an endless video tape.

INDUSTRIAL APPLICABILITY

As described above, in a system for providing information service by still picture television broadcasting, if a specific frame is used as reference and if it is known in what kind of relationship with the specific frame the desired frame is transmitted, the desired frame can be identified using the specific reference frame as a clue in the present invention, which provides a method and an apparatus for easily executing the capturing of the desired still picture frame.

I claim:

1. A time-division still picture television system for using a plurality of still pictures by time-division still picture system, whereby:

a frame of said still picture comprises a reference frame having identification signal and an information frame having no identification signal;

said information frame comprises a menu screen frame for displaying a menu screen and an information screen frame;

positional relationship of said menu screen frame to said reference frame is set to a constant value;

counting information on said positional relationship of said information screen frame to said menu screen frame is displayed on said menu screen;

said menu screen frame arranged at a specific position to said reference frame is detected according to said reference frame having said identification signal as reference; and number of frames is counted according to said positional relationship displayed on said menu screen frame and a desired information screen frame is detected.

2. A time-division still picture television system according to claim 1, wherein there are a plurality of said reference frames, and each of said plurality of reference frames has a different identification signal.

3. A time-division still picture television system according to claim 1, wherein said menu screen frame is displayed as an initial operation and a basic operation of the time-division still picture television system.

4. A time-division still picture television system according to claim 1, wherein said menu screen frame comprises a main menu screen frame and a sub-menu screen frame, and said main menu screen frame is arranged at a specific position to said reference frame; and said sub-menu screen frame is arranged at a specific position to said main menu screen frame.

5. A time-division still picture television system, for using a plurality of still pictures by time-division still picture system; whereby:

a frame of said still picture comprises a reference frame having identification signal and an information frame having no identification signal;

said information frame comprises a menu screen frame for displaying a menu screen and an information screen frame;

positional relationship of said menu screen frame to said reference frame is set to a constant value;

counting information on said positional relationship of said information screen frame to said menu screen frame is displayed on said menu screen; and by adding counting information on said positional relationship to said constant value, the positional relationship of said information screen frame to said reference frame is calculated.

6. A time-division still picture television system according to claim 5, wherein there are a plurality of said reference frames, and each of said plurality of reference frames has a different identification signal.

7. A time-division still picture television system according to claim 5, wherein said menu screen frame is displayed as an initial operation and a basic operation of the time-division still picture television system.

8. A time-division still picture television system according to claim 5, wherein said menu screen frame comprises a main menu screen frame and a sub-menu screen frame, and said main menu screen frame is arranged at a specific position to said reference frame; and said sub-menu screen frame is arranged at a specific position to said main menu screen frame.

* * * * *